US012746567B2

(12) United States Patent
Lee et al.

(10) Patent No.: US 12,746,567 B2
(45) Date of Patent: Sep. 29, 2026

(54) STAGE AND CURING DEVICE HAVING THE SAME

(71) Applicant: Samsung Display Co., Ltd., Yongin-si (KR)

(72) Inventors: Kyungeun Lee, Asan-si (KR); Suin Kim, Asan-si (KR); Yong-Kwan Kim, Yongin-si (KR); Chulho Yoon, Asan-si (KR); Seungjun Lee, Cheonan-si (KR); Jinnyoung Heo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 783 days.

(21) Appl. No.: 17/987,334

(22) Filed: Nov. 15, 2022

(65) Prior Publication Data

US 2023/0201864 A1 Jun. 29, 2023

(30) Foreign Application Priority Data

Dec. 23, 2021 (KR) ........................ 10-2021-0186191

(51) Int. Cl.

*B05C 9/14* (2006.01)
*B05C 13/00* (2006.01)
*B29C 35/08* (2006.01)

(52) U.S. Cl.

CPC ................ *B05C 9/14* (2013.01); *B05C 13/00* (2013.01); *B29C 35/0805* (2013.01); *B29C 2035/0827* (2013.01)

(58) Field of Classification Search

CPC .............. B05C 9/14; B29C 2035/0827; B29C 35/0805; B29C 66/028; B29C 2045/0075; B29C 33/06

See application file for complete search history.

(56) References Cited

U.S. PATENT DOCUMENTS

| | | | | |
|---|---|---|---|---|
| 9,439,315 | B2 | 9/2016 | Lee et al. | |
| 2007/0211197 | A1* | 9/2007 | Tashiro | G02F 1/133509 349/190 |
| 2011/0157538 | A1* | 6/2011 | Lee | G02F 1/1339 349/190 |
| 2012/0247647 | A1 | 10/2012 | Moriyama et al. | |
| 2013/0284350 | A1 | 10/2013 | Ishii et al. | |

FOREIGN PATENT DOCUMENTS

| | | | |
|---|---|---|---|
| JP | 2001356312 | A | 12/2001 |
| JP | 2013231796 | A | 11/2013 |
| KR | 1020130118452 | A | 10/2013 |
| KR | 101652800 | B1 | 9/2016 |
| KR | 101801994 | B1 | 11/2017 |
| KR | 20190134990 | A | 12/2019 |
| KR | 102148822 | B1 | 8/2020 |

* cited by examiner

*Primary Examiner* — Philip C Tucker
*Assistant Examiner* — Jimmy R Smith, Jr.
(74) *Attorney, Agent, or Firm* — CANTOR COLBURN LLP

(57) ABSTRACT

A stage includes a bottom portion, a plurality of support portions extending in a first direction and spaced apart from each other in a second direction crossing the first direction, a plurality of blocks coupled with the support portions, respectively, and a plurality of porous films covering upper surfaces of the blocks, respectively.

20 Claims, 12 Drawing Sheets

STAGE AND CURING DEVICE HAVING THE SAME

This application claims priority to Korean Patent Application No. 10-2021-0186191, filed on Dec. 23, 2021, and all the benefits accruing therefrom under 35 U.S.C. § 119, the content of which in its entirety is herein incorporated by reference.

BACKGROUND

1. Field

The disclosure relates to a stage and a curing device including the stage. More particularly, the disclosure relates to a stage capable of improving a curing reliability and a curing device including the stage.

2. Description of the Related Art

A curing device applies a coating agent to a curing target and radiates an ultraviolet light to cure the coating agent, and thus, the coating agent is cured. The curing target may be a window of a display device. The stage may be used to move or support the curing target.

SUMMARY

The disclosure provides to a stage capable of improving a curing reliability.

The present disclosure provides a curing device including the stage.

Embodiments of the invention provide a stage including a bottom portion, a plurality of support portions extending in a first direction and spaced apart from each other in a second direction crossing the first direction, a plurality of blocks coupled with the plurality of support portions, respectively, and a plurality of porous films covering upper surfaces of the plurality of blocks, respectively.

In an embodiment, the plurality of blocks may be inserted detachably into the plurality of support portions, respectively.

In an embodiment, the plurality of blocks and the plurality of support portions may include a magnetic material.

In an embodiment, each of the plurality of blocks may include the upper surface and a plurality of side surfaces connected to the upper surface, and each of a plurality of boundary portions, where the upper surface is in contact with the plurality of side surfaces, respectively, may have a radius of curvature.

In an embodiment, the radius of curvature may be equal to or greater than about 4 millimeters (mm) and equal to or smaller than about 5 mm.

In an embodiment, the plurality of blocks may include a plurality of first blocks and a plurality of second blocks, each having a shape different from a shape of each of the plurality of first blocks, and one side surface of the plurality of first blocks may be provided with a groove defined therein.

In an embodiment, the plurality of first blocks may be arranged spaced apart from each other in the second direction, some second blocks among the plurality of second blocks may be disposed between two first blocks adjacent to each other among the plurality of first blocks, and other second blocks among the plurality of second blocks may be disposed between other two first blocks adjacent to each other among the plurality of first blocks.

In an embodiment, one of the two first blocks adjacent to each other may face one of the other two first blocks adjacent to each other.

In an embodiment, the bottom portion, the plurality of support portions, and the plurality of blocks may have a white color.

In an embodiment, a porous film among the plurality of porous films may cover the upper surface and the plurality of side surfaces of a corresponding block among the plurality of blocks, and a portion of the porous film covering the plurality of side surfaces may be disposed between a corresponding support portion among the plurality of support portions and the corresponding block.

In an embodiment, each of the plurality of porous films may be provided with a plurality of openings defined through opposing sides thereof.

In an embodiment, each of the plurality of porous films may include a body portion, a protrusion portion, and a corner connection portion, the body portion may cover an upper surface and two side surfaces of a corresponding block among the plurality of blocks, the protrusion portion may cover one side surface connected to the two side surfaces, and the corner connection portion may be connected to the body portion and the protrusion portion.

In an embodiment, each of the plurality of porous films may have a thickness equal to or greater than about 0.1 mm and equal to or smaller than about 0.3 mm.

In an embodiment, a plurality of pores may be defined in each of the plurality of porous films, and a diameter of each of the plurality of pores may be equal to or greater than about 2 micrometers (μm) and equal to or smaller than about 3 μm.

Embodiments of the invention provide a curing device including a stage and a light irradiation portion which radiates a light to the stage. In such embodiments, the stage includes a bottom portion, a plurality of support portions extending in a first direction and spaced apart from each other in a second direction crossing the first direction, a plurality of blocks coupled with the plurality of support portions and inserted detachably into the plurality of support portions, respectively, and a plurality of porous films covering upper surfaces of the plurality of blocks, respectively.

In an embodiment, each of the plurality of blocks may include an upper surface and a plurality of side surfaces connected to the upper surface, and each of a plurality of boundary portions, where the upper surface is in contact with the plurality of side surfaces, respectively, may have a radius of curvature.

In an embodiment, the radius of curvature may be equal to or greater than about 4 mm and equal to or smaller than about 5 mm.

In an embodiment, the plurality of blocks may include a plurality of first blocks and a plurality of second blocks, each having a shape different from a shape of each of the plurality of first blocks, and one side surface of the plurality of first blocks may be provided with a groove defined therein.

In an embodiment, the plurality of first blocks may be arranged spaced apart from each other in the second direction, some second blocks among the plurality of second blocks may be disposed between two first blocks adjacent to each other among the plurality of first blocks, and other second blocks among the plurality of second blocks may be disposed between other two first blocks adjacent to each other among the plurality of first blocks.

In an embodiment, a porous film among the plurality of porous films may cover the upper surface and the plurality of side surfaces of a corresponding block among the plurality of blocks, and a portion of the porous film covering the plurality of side surfaces may be disposed between a corresponding support portion among the plurality of support portions and the one block.

According to embodiments, when a portion of the blocks is contaminated during a curing process, the contaminated block may be separated from a corresponding support portion to remove the contaminants. Accordingly, it is easy to manage foreign substances and contaminations, and thus, a quality of a window disposed on the stage is improved.

In such embodiments, each of the boundary portions of the blocks has a predetermined radius of curvature, and thus, a stain occurring on the window during the curing process of the window due to a difference in structure between a portion where the blocks are disposed and a portion where the blocks are not disposed is substantially reduced or effectively prevented.

In such embodiments, the porous films cover the upper surfaces of the blocks. The porous films cause a diffusion and a diffused reflection of the light, and thus, a difference in optical properties between media is reduced. Accordingly, a difference in optical properties between the blocks and a gap space between the blocks is substantially reduced or removed. In such embodiments, a friction between the stage and the window is reduced by the porous film, and the window is effectively prevented from being damaged.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1:
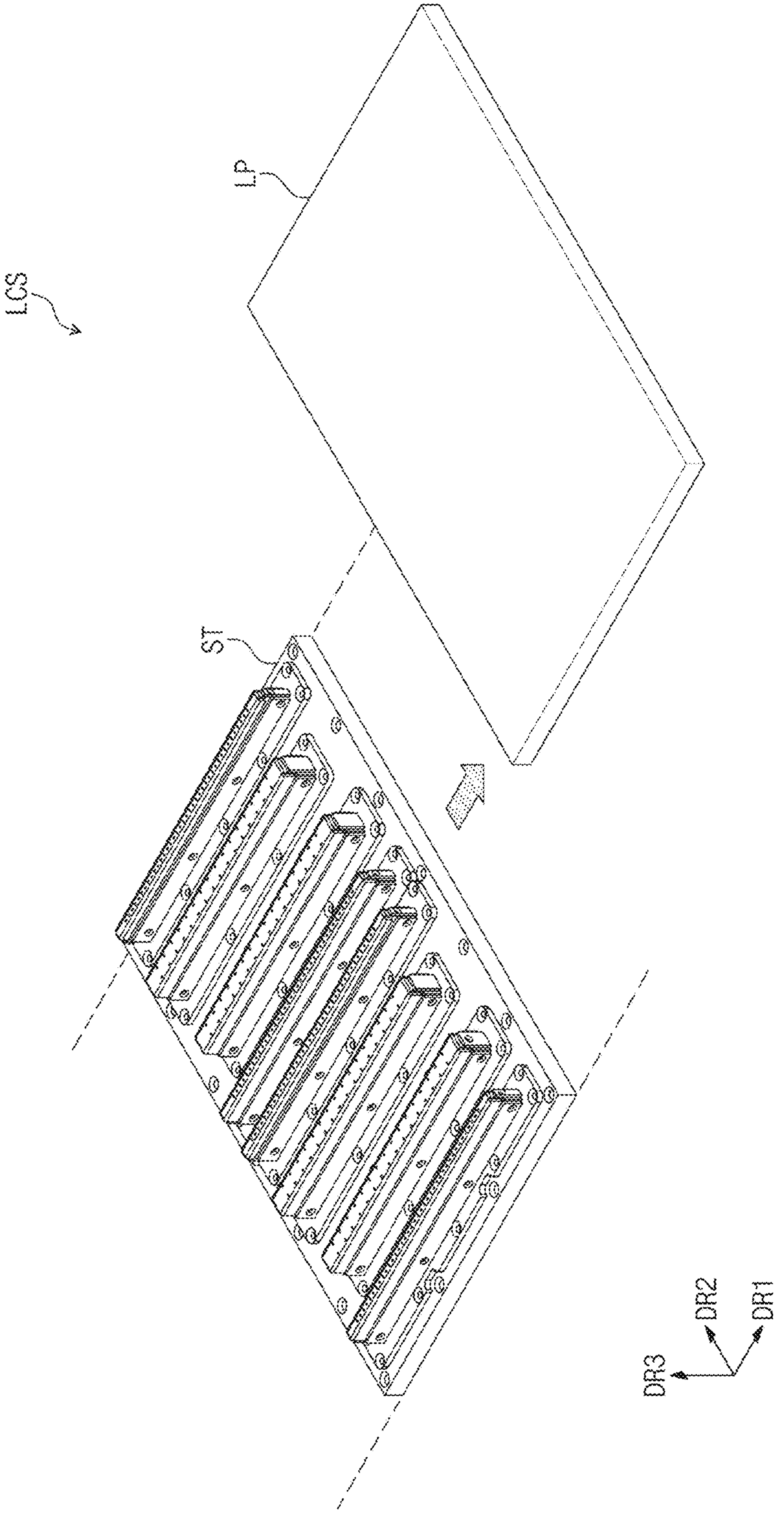
FIG. 1 is a perspective view of a curing device according to an embodiment of the present disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. "Or" means "and/or." As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an."

Spatially relative terms, such as "beneath", "below", "lower", "above", "upper" and the like, may be used herein for ease of description to describe one element or feature's relationship to another elements or features as shown in the figures.

It will be further understood that the terms "comprises" and/or "comprising," or "includes" and/or "including", when used in this specification, specify the presence of stated features, integers, steps, operations, elements, and/or components, but do not preclude the presence or addition of one or more other features, integers, steps, operations, elements, components, and/or groups thereof.

The term "part" or "unit" as used herein is intended to mean a software component or a hardware component that performs a specific function. The hardware component may include, for example, a field-programmable gate array (FPGA) or an application-specific integrated circuit (ASIC). The software component may refer to an executable code and/or data used by the executable code in an addressable storage medium. Thus, the software components may be, for example, object-oriented software components, class components, and task components, and may include processes, functions, attributes, procedures, subroutines, segments of program code, drivers, firmware, micro codes, circuits, data, a database, data structures, tables, arrays, or variables.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations or within ±30%, 20%, 10% or 5% of the stated value.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described with reference to accompanying drawings.

FIG. 1 is a perspective view of a curing device LCS according to an embodiment of the present disclosure.

Referring to FIG. 1, an embodiment of the curing device LCS may include a stage ST and a light irradiation portion (or part) LP. In an embodiment, the light irradiation portion LP may be a lamp LP.

The stage ST may move a window WIN (refer to FIG. 5) under the lamp LP to cure the window WIN. The window WIN may be disposed on the stage ST. An arrangement between the window WIN and the stage ST will be described later with reference to FIG. 5.

The stage ST may move in a first direction DR1 to be disposed under the lamp LP. The lamp LP may radiate a light to the stage ST. The light irradiated by the lamp LP may be, but not limited to, an ultraviolet light. The lamp LP may cure the window WIN disposed on the stage ST. In such an embodiment, the window WIN (refer to FIG. 5) may be an object that is disposed on the stage ST, however, it should not be particularly limited. In an alternative embodiment, for example, the object disposed on the stage ST may be any other object that is curable by the light radiated by the lamp LP.

According to an embodiment, configurations of the stage ST, which will be described later, may prevent the window WIN disposed on the stage ST from being stained. Accordingly, in such an embodiment, appearance defect rate of the window WIN may be reduced.

Figure 2:
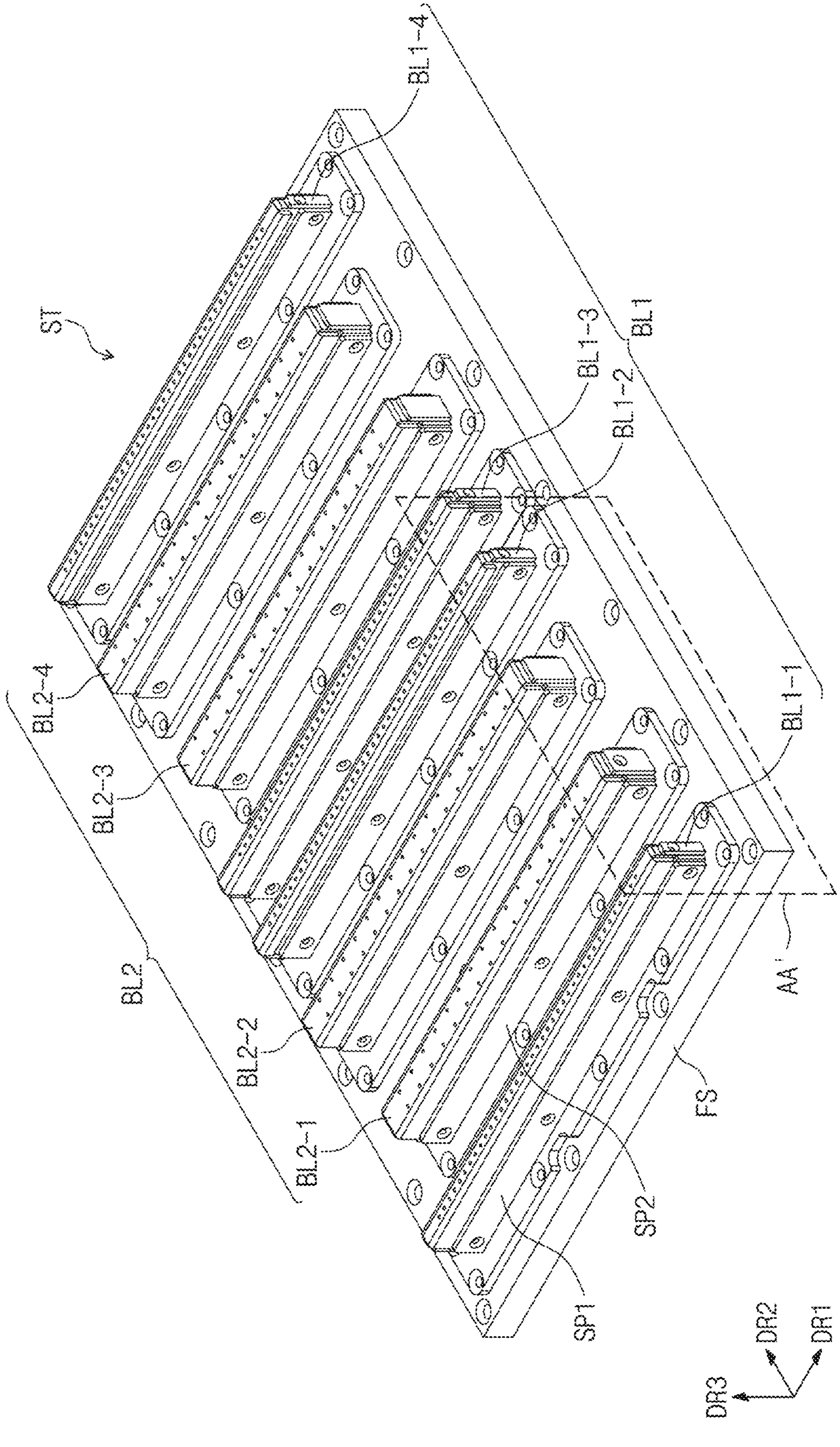
FIG. 2 is a perspective view of a stage according to an embodiment of the present disclosure.

FIG. 2 is a perspective view of the stage ST according to an embodiment of the present disclosure.

Referring to FIG. 2, an embodiment of the stage ST may include a bottom portion FS, first blocks BL1, second blocks BL2, first support portions SP1, and second support portions SP2.

The bottom portion FS may be disposed under the first support portions SP1 and the second support portions SP2. The bottom portion FS may support the first support portions SP1 and the second support portions SP2. The bottom portion FS may be referred to as a support substrate or a base substrate.

The first support portions SP1 may be disposed on the bottom portion FS. The first support portions SP1 may extend in the first direction DR1 and may be arranged spaced apart from each other in a second direction DR2 crossing the first direction DR1. The second support portions SP2 may be disposed on the bottom portion FS. The second support portions SP2 may extend in the first direction DR1 and may be arranged spaced apart from each other in the second direction DR2.

Each of the first and second support portions SP1 and SP2 may include or define a space in which the first and second blocks BL1 and BL2 are accommodated. In an embodiment, for example, each of the first and second support portions SP1 and SP2 may include a bottom portion SBP (refer to FIG. 3A) coupled with the bottom portion FS and at least two sidewalls SSP1 and SSP2 (refer to FIG. 3A) protruded from the bottom portion SBP. Accordingly, each of the first and second support portions SP1 and SP2 may include two sidewalls SSP1 and SSP2 spaced apart from each other and a space may be defined between the sidewalls SSP1 and SSP2. Each of the first and second blocks BL1 and BL2 may be inserted into a corresponding space.

The first blocks BL1 may be coupled with the first support portions SP1, respectively. The first blocks BL1 may be inserted detachably into the first support portions SP1. The first blocks BL1 may include a first block BL1-1, a second first block BL1-2, a third first block BL1-3, and a fourth first block BL1-4. A shape of the first blocks BL1 will be described later with reference to FIGS. 3A and 3B.

The second blocks BL2 may be coupled with the second support portions SP2. The second blocks BL2 may be inserted detachably into the second support portions SP2. The second blocks BL2 may include a first second block BL2-1, a second block BL2-2, a third second block BL2-3, and a fourth second block BL2-4. The second blocks BL2 may have a shape different from that of the first blocks BL1. The shape of the second blocks BL2 will be described later with reference to FIGS. 4A and 4B.

According to an embodiment, when a portion of the first and second blocks BL1 and BL2 is contaminated during a curing process, the contaminated block may be separated from the support portion, and thus, the contaminants may be removed. Accordingly, foreign substances and contaminations may be effectively managed, and a quality of the window disposed on the stage ST may be improved.

The first block BL1 and the second block BL2 may extend in the first direction DR1 and may be arranged spaced apart from each other in the second direction DR2. Some second blocks BL2-1 and BL2-2 among the second blocks BL2 may be disposed between two first blocks BL1-1 and BL1-2 adjacent to each other among the first blocks BL1. The other second blocks BL2-3 and BL2-4 among the second blocks BL2 may be disposed between the other two first blocks BL1-3 and BL1-4 adjacent to each other among the first blocks BL1. The second first block BL1-2 that is one of the two first blocks BL1-1 and BL1-2 adjacent to each other may face the third first block BL1-3 that is one of the other two first blocks BL1-3 and BL1-4 adjacent to each other.

In an embodiment, the first support portions SP1, the second support portions SP2, the first blocks BL1, and the second blocks BL2 may include a magnetic material. Accordingly, the first blocks BL1 may be attached to the first support portions SP1 by a magnetic force or the second blocks BL2 may be attached to the second support portions SP2 by the magnetic force.

In an embodiment, the bottom portion FS, the first support portions SP1, the second support portions SP2, the first blocks BL1, and the second blocks BL2 may have a white color. In such an embodiment, a reflectance of the stage ST with respect to an external light provided thereto may increase. The color of the bottom portion FS, the first support portions SP1, the second support portions SP2, the first blocks BL1, and the second blocks BL2 should not be limited to the white color. In an alternative embodiment, for example, the bottom portion FS, the first support portions SP1, the second support portions SP2, the first blocks BL1, and the second blocks BL2 may have a gray color.

Figure 3A:
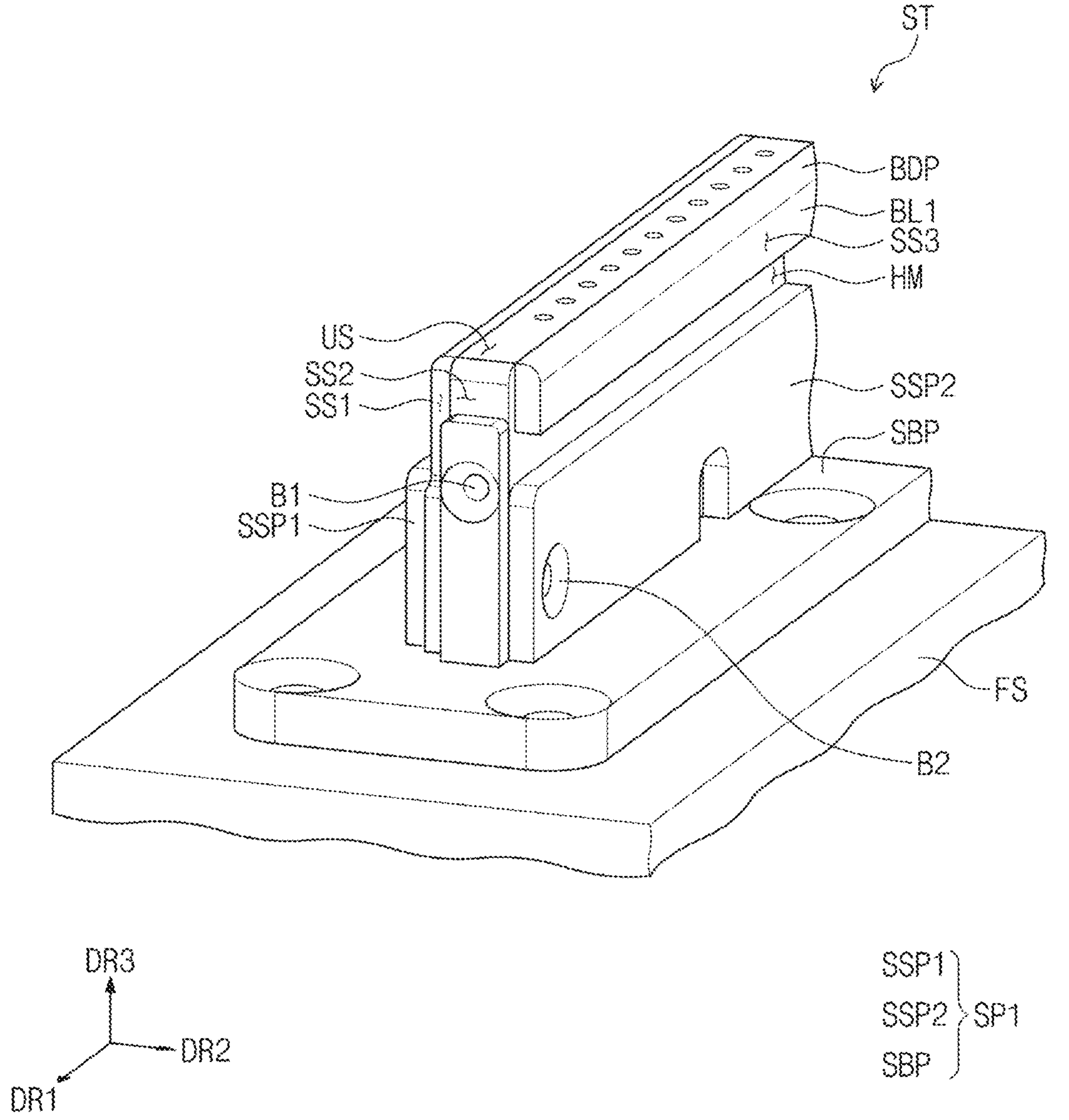
FIG. 3A is an enlarged perspective view of a portion of a stage according to an embodiment of the present disclosure.
Figure 3B:
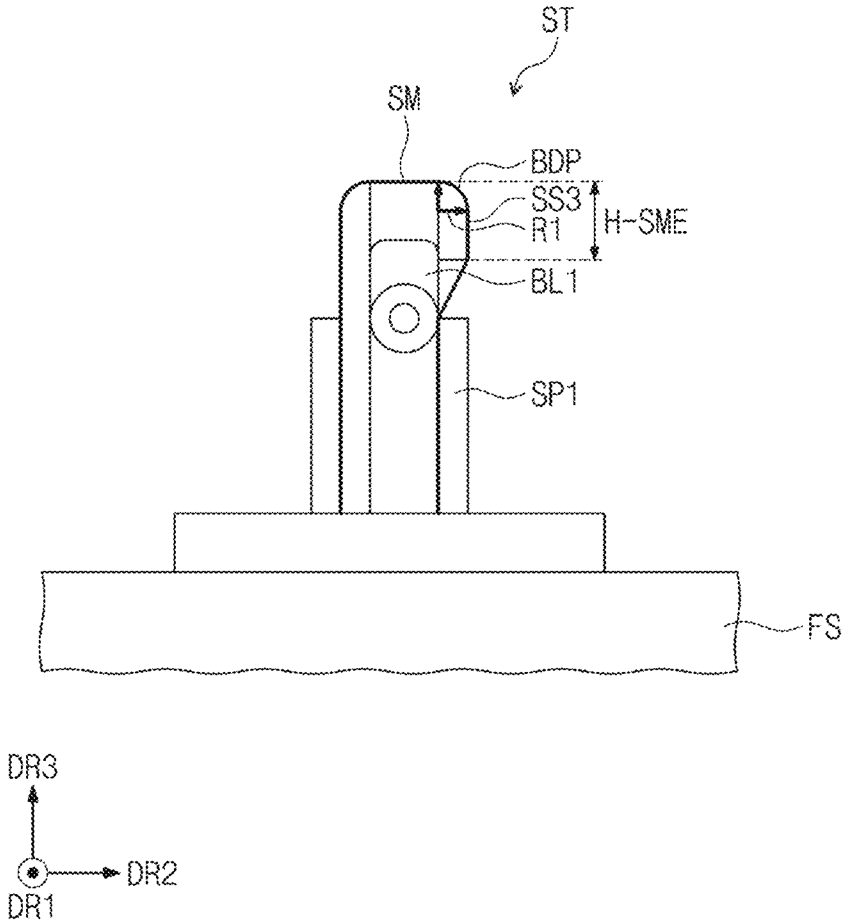
FIG. 3B is an enlarged cross-sectional view of a portion of a stage according to an embodiment of the present disclosure.

FIG. 3A is an enlarged perspective view of a portion of the stage ST according to an embodiment of the present disclosure. FIG. 3B is an enlarged cross-sectional view of a portion of the stage ST according to an embodiment of the present disclosure.

FIGS. 3A and 3B show one first block BL1 among the first blocks BL1, one first support portion SP1 among the first support portions SP1, and a portion of the bottom portion FS. The configuration of the first block BL1 described below may be applied to all the first blocks BL1. In an embodiment, for example, the first block BL1 shown in FIGS. 3A and 3B may have substantially the same shape as the first blocks BL1-1 and BL1-3 shown in FIG. 2. The first blocks BL1-2 and BL1-4 shown in FIG. 2 may have a shape corresponding to a symmetrical shape of the first block BL1 shown in FIGS. 3A and 3B.

Referring to FIGS. 3A and 3B, the first block BL1 may include an upper surface US and a plurality of side surfaces SS1, SS2, and SS3 connected to the upper surface US. The first block BL1 may include four side surfaces, however, only three side surfaces SS1, SS2, and SS3 are shown in FIG. 3A. In an embodiment, for example, one side surface not shown in FIG. 3A may be a surface facing a third side surface SS3.

A plurality of boundary portions BDP, where the upper surface US is in contact with the side surfaces SS1, SS2, and SS3, respectively, may each have a first radius of curvature R1. The first radius of curvature R1 may be equal to or greater than about 4 millimeters (mm) and equal to or smaller than about 5 mm. However, the first radius of curvature R1 should not be limited thereto or thereby. According to an embodiment, each of the boundary portions BDP has the first radius of curvature R1, such that the stain occurring on the window during the curing process of the window due to a difference in structure between a portion at which the first block BL1 is disposed and a portion at which the first block BL1 is not disposed may be substantially reduced or effectively prevented.

A groove HM may be defined in one side surface SS3 (hereinafter, referred to as the third side surface) of the first block BL1. The groove HM may be formed to maintain a distance from a robot arm RH (refer to FIG. 5) that is used to move the window WIN (refer to FIG. 5) disposed on the stage ST shown in FIG. 5. A length H-SME of the third side surface SS3 among the side surfaces SS1, SS2, and SS3 may be related to a length of the groove HM. Accordingly, the length H-SME of the third side surface SS3 may be changed depending on a size of the robot arm RH and the window WIN and an arrangement of the first blocks BL1. Details thereof will be described later with reference to FIG. 5.

A porous film SM may cover the upper surface US of the first block BL1. The porous film SM may cover the upper surface US and the side surfaces SS1, SS2, and SS3 of each of the first blocks BL1, and a portion of the porous film SM covering the side surfaces SS1, SS2, and SS3 may be disposed and held between the first support portion SP1 and the first block BL1.

The porous film SM may have a thickness equal to or greater than about 0.1 mm and equal to or smaller than about 0.3 mm. The thickness of the porous film SM may be changed depending on the thickness of the window WIN (refer to FIG. 5) to be cured. In an embodiment, for example, as the thickness of the window WIN increases, the thickness of the porous film SM may increase. The thickness of the porous film SM may be determined as a thickness that minimizes or does not cause the stain on the window WIN (refer to FIG. 5) through multiple experiments.

The first support portion SP1 may include a plurality of bolts B1 and B2. The bolts B1 and B2 may include a first bolt B1 and a second bolt B2. FIG. 3A shows two bolts B1 and B2 as a representative example, however, the number of the bolts should not be limited thereto or thereby.

According to a conventional curing device, when a lamp radiates a light to the window, the stain may occur along boundaries of blocks due to a difference in optical properties between the blocks and a gap space defined between the blocks of the stage. According to an embodiment of the invention, the porous films SM may cover the upper surfaces US or USa of the blocks BL1 or BL2. The porous film SM may cause a diffusion and a diffused reflection of the light, and thus, a difference in optical properties between media may be reduced. Accordingly, the difference in optical properties between the blocks BL1 or BL2 covered by the porous films SM and the gap space may be substantially reduced or effectively prevented. In such an embodiment, a friction between the stage ST (refer to FIG. 2) and the window WIN (refer to FIG. 5) may be reduced by the porous film SM, and the window WIN may be effectively prevented from being damaged.

Figure 3C:
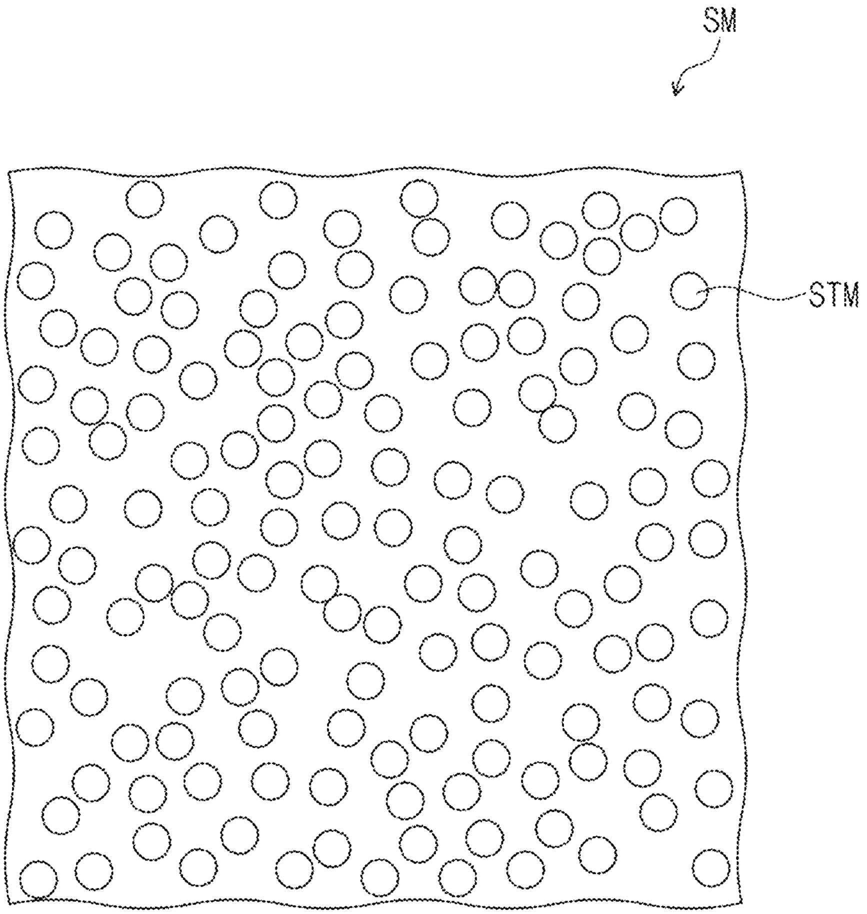
FIG. 3C is a view of a porous film according to an embodiment of the present disclosure.

FIG. 3C is a view of the porous film SM according to an embodiment of the present disclosure.

Referring to FIG. 3C, an embodiment of the porous film SM may include a plurality of pores STM, and each of the pores STM has a diameter equal to or greater than about 2 μm and equal to or smaller than about 3 μm. The light incident into the porous film SM may be diffused or diffusively reflected by the pores STM.

Figure 4A:
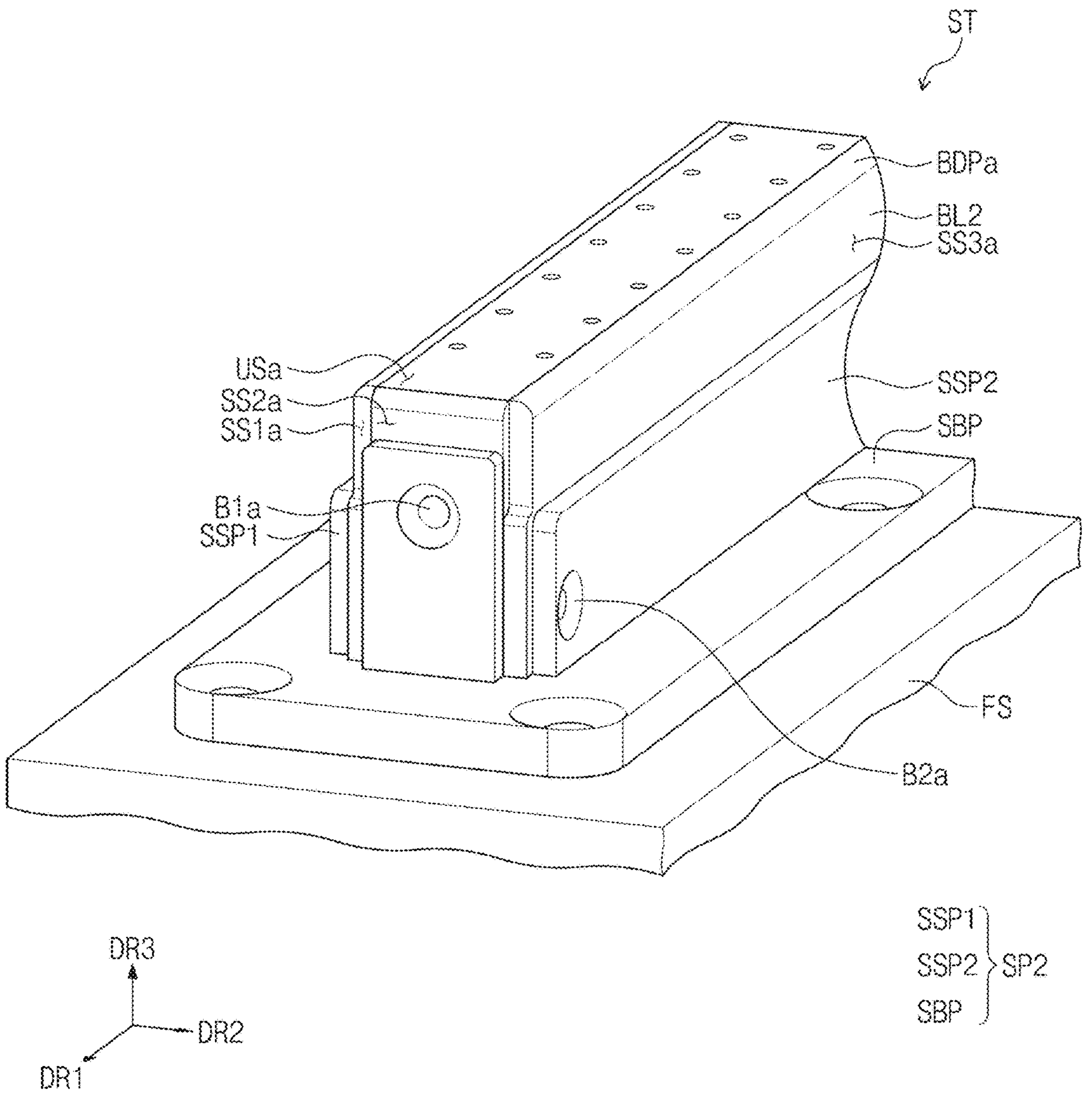
FIG. 4A is an enlarged perspective view of a portion of a stage according to an embodiment of the present disclosure.
Figure 4B:
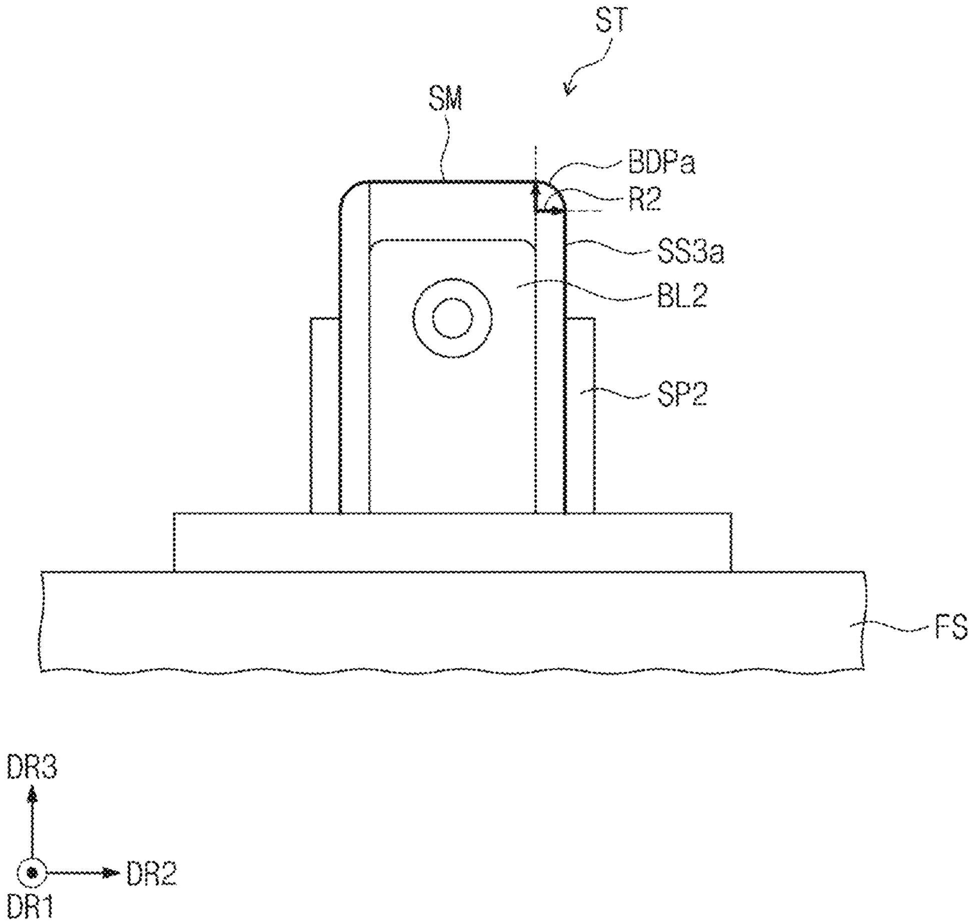
FIG. 4B is an enlarged cross-sectional view of a portion of a stage according to an embodiment of the present disclosure.

FIG. 4A is an enlarged perspective view of a portion of the stage ST according to an embodiment of the present disclosure. FIG. 4B is an enlarged cross-sectional view of a portion of the stage ST according to an embodiment of the present disclosure.

FIGS. 4A and 4B show one second block BL2 among the second blocks BL2, one second support portion SP2 among the second support portions SP2, and the bottom portion FS. The configuration of the second block BL2 described below may be applied to all the second blocks BL2.

Referring to FIGS. 4A and 4B, in an embodiment, the second block BL2 may include the upper surface USa and a plurality of side surfaces SS1*a*, SS2*a*, and SS3*a* connected to the upper surface USa. A plurality of boundary portions, where the upper surface USa is in contact with the side surfaces SS1*a*, SS2*a*, and SS3*a*, respectively, may each have a second radius of curvature R2. The second radius of curvature R2 may be equal to or greater than about 4 mm and equal to or smaller than about 5 mm. However, the second radius of curvature R2 should not be limited thereto or thereby. According to an embodiment, the second blocks BL2 has the second radius of curvature R2, such that the stain occurring on the window during the curing process of the window due to a difference in structure between a portion at which the second block BL2 is disposed and a portion at which the second block BL2 is not disposed may be substantially reduced or effectively prevented.

The porous film SM may cover the upper surface USa of the second block BL2. The porous film SM may cover the upper surface USa and the side surfaces SS1*a*, SS2*a*, and SS3*a* of each of the second blocks BL2, and a portion of the porous film SM covering the side surfaces SS1*a*, SS2*a*, and SS3*a* may be disposed and held between the second support portion SP2 and the second block BL2.

The porous film SM may have a thickness equal to or greater than about 0.1 mm and equal to or smaller than about 0.3 mm. The thickness of the porous film SM may be changed depending on the thickness of the window WIN (refer to FIG. 5) to be cured. In an embodiment, for example, as the thickness of the window WIN increases, the thickness of the porous film SM may increase. The thickness of the porous film SM may be determined as a thickness that minimizes or does not cause the stain on the window WIN (refer to FIG. 5) through multiple experiments.

The second support portion SP2 may include a plurality of bolts B1*a* and B2*a*. The bolts B1*a* and B2*a* may include a first bolt B1*a* and a second bolt B2*a*. FIG. 4A shows two bolts B1*a* and B2*a* as a representative example, however, the number of the bolts should not be limited thereto or thereby.

According to an embodiment of the present disclosure, the porous films SM may cover the upper surfaces US or USa of the blocks BL1 or BL2. The porous film SM may cause the diffusion and the diffused reflection of the light, and thus, the difference in optical properties between media may be reduced. Accordingly, the difference in optical properties between the blocks BL1 or BL2 covered by the porous films SM and the gap space may be substantially reduced or effectively prevented. In such an embodiment, a friction between the stage ST (refer to FIG. 2) and the window WIN (refer to FIG. 5) may be reduced by the porous film SM, and the window WIN may be effectively prevented from being damaged.

In an embodiment, as described above, the porous film SM are coupled with the blocks BL1 and BL2, such that the window may be effectively prevented from being damaged, and the stain occurring on the window during the curing process of the window may be reduced. Accordingly, a yield of the curing process of the window may be improved.

Figure 5:
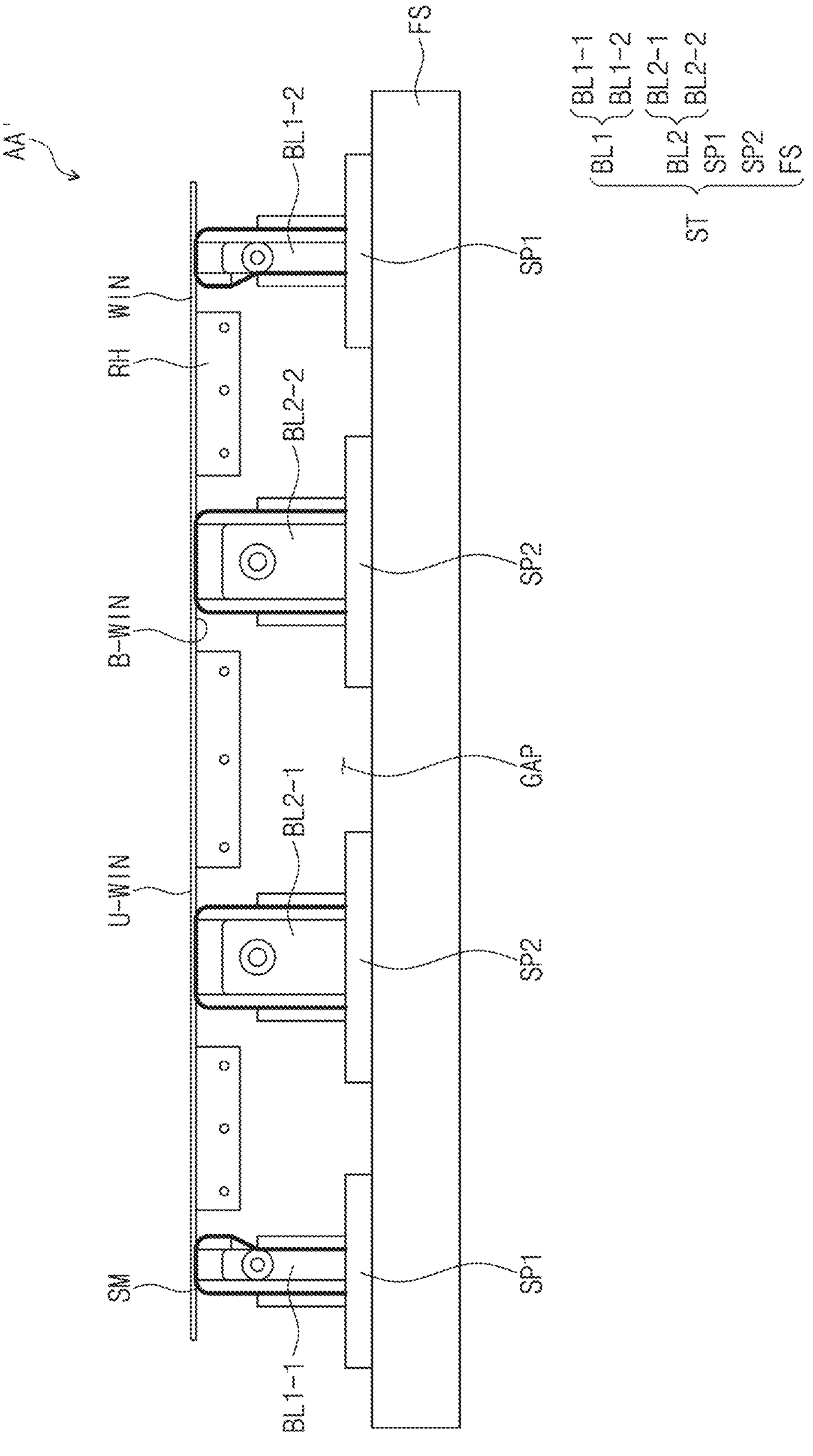
FIG. 5 is a view of an area AA' shown in FIG. 2 according to an embodiment of the present disclosure.

FIG. 5 is a view of an area AA' shown in FIG. 2 according to an embodiment of the present disclosure.

Referring to FIG. 5, in an embodiment, the window WIN may be disposed on the first blocks BL1 and the second blocks BL2 of the stage ST. In such an embodiment, the window WIN may be in contact with the porous film SM disposed on the upper surface of the first and second blocks BL1 and BL2.

Since the window WIN has a property of being easily broken, it is desired to reduce a contact area between other components of the curing device LCS (refer to FIG. 1) and the window WIN to minimize the stain during the curing process. Accordingly, the window WIN may be lifted by the robot arm RH placed on a lower surface B-WIN of the window WIN without being in contact with an upper surface U-WIN of the window WIN on which the curing process is performed. A dedicated stage ST may be desired to use the robot arm RH.

The robot arm RH may move and place the window WIN on the stage ST. The stage ST may move to allow the window WIN to move to an area where the lamp LP (refer to FIG. 1) radiates the light. A tolerance may be set in the process of lifting the window WIN by the robot arm RH. As the groove is formed in the first block BL1, the distance between the first and second blocks BL1 and BL2 and the robot arm RH inserted into between the first block BL1 and the second block BL2 may be maintained. Therefore, when the window WIN moves by the robot arm RH, interference may not occur between the robot arm RH and the first and second blocks BL1 and BL2, and thus, undesired impacts may not be transmitted to the window WIN.

Figure 6:
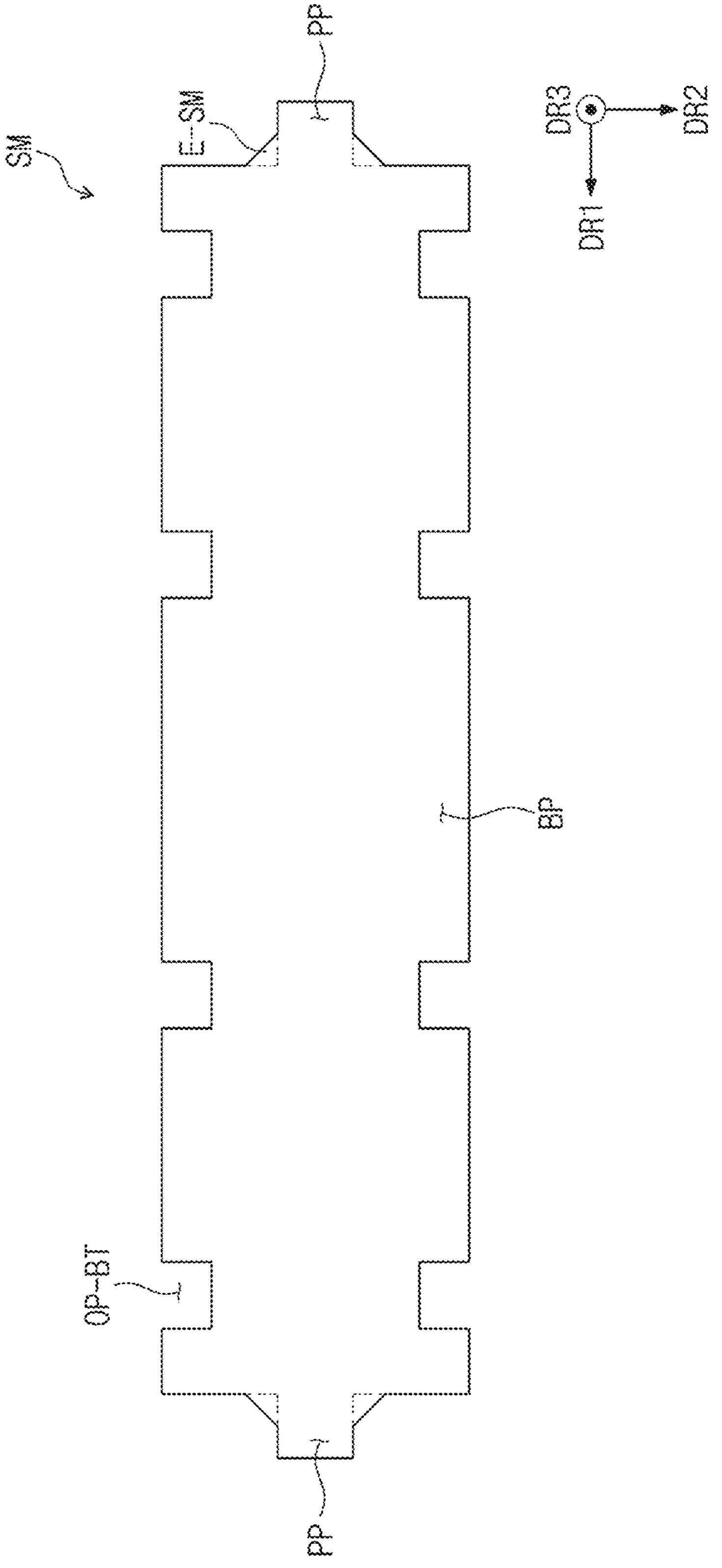
FIG. 6 is a plan view of a porous film according to an embodiment of the present disclosure.

FIG. 6 is a plan view of the porous film SM according to an embodiment of the present disclosure. In detail, FIG. 6 is a plan view of the porous film SM before the porous film SM is coupled with the blocks BL1 and BL2 (refer to FIG. 2).

Referring to FIGS. 3A, 4A, and 6, in an embodiment, the porous film SM may include a body portion BP, a protrusion portion PP, and a corner connection portion E-SM. In such an embodiment, the porous film SM may be provided with a plurality of openings OP-BT defined at opposing sides where the protrusion portion PP is not formed.

The openings OP-BT may overlap the bolts B1 and B2 formed in the side surfaces SS1 to SS3 of the first blocks BL1 or the bolts B1*a* and B2*a* formed in the side surfaces SS1*a* to SS3*a* of the second blocks BL2. FIG. 6 shows an embodiment with eight openings OP-BT each having a quadrangular shape as a representative example, however, the shape and the number of the openings OP-BT should not be limited thereto or thereby. The shape and the number of the openings OP-BT may be variously modified depending on the shape and the number of the bolts B1 and B2 or B1*a* and B2*a*. In an alternative embodiment, for example, each of the openings OP-BT may have a circular shape or a triangular shape.

The body portion BP of the porous film SM may cover the first side surface SS1 or SS1*a*, the third side surface SS3 or SS3*a*, and the upper surface US or USa of the corresponding block among the blocks BL1 or BL2. The protrusion portion PP of the porous film SM may cover the second side surface SS2 or SS2*a* and a side surface opposite to the second side surface SS2 or SS2*a* of the corresponding block among the blocks BL1 or BL2.

The corner connection portion E-SM of the porous film SM may cover portions where the second side surface SS2 or SS2*a* of the blocks BL1 or BL2 is connected to the first side surface SS1 or SS1*a* and the third side surface SS3 or SS3*a* and may cover portions where a side surface opposite to the second side surface SS2 or SS2*a* is connected to the first side surface SS1 or SS1*a* and the third side surface SS3 or SS3*a*.

FIG. 6 shows an embodiment including four corner connection portions E-SM each having a triangular shape as a representative example, however, the shape and the number of the corner connection portions E-SM should not be limited thereto or thereby. In an alternative embodiment, for example, the shape of the corner connection portion E-SM may have an arc shape and the corner connection portion E-SM may not be formed in some protrusion portions PP among the protrusion portions PP.

Figure 7A:
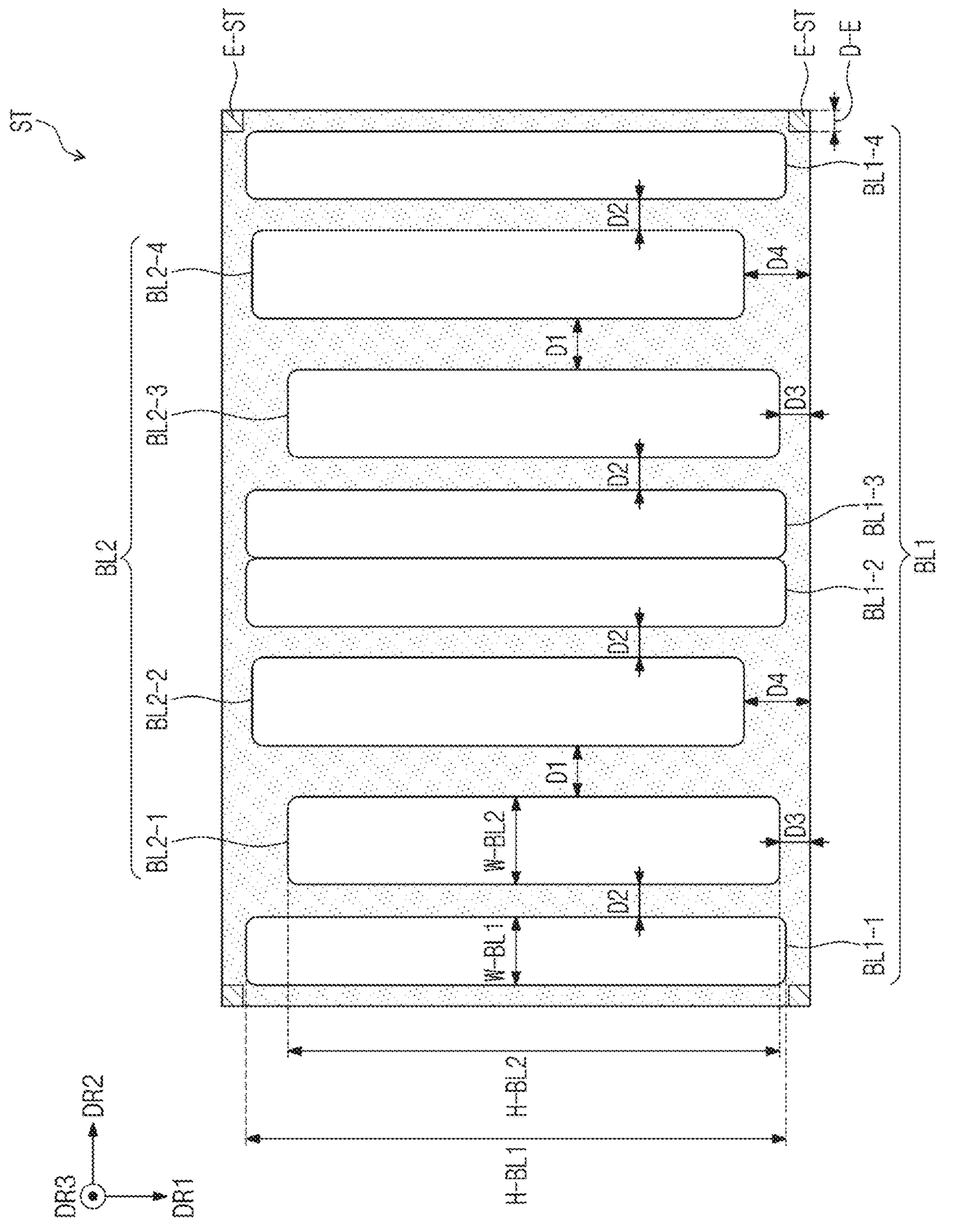
FIGS. 7A to 7C are plan views of stages according to embodiments of the present disclosure.
Figure 7B:
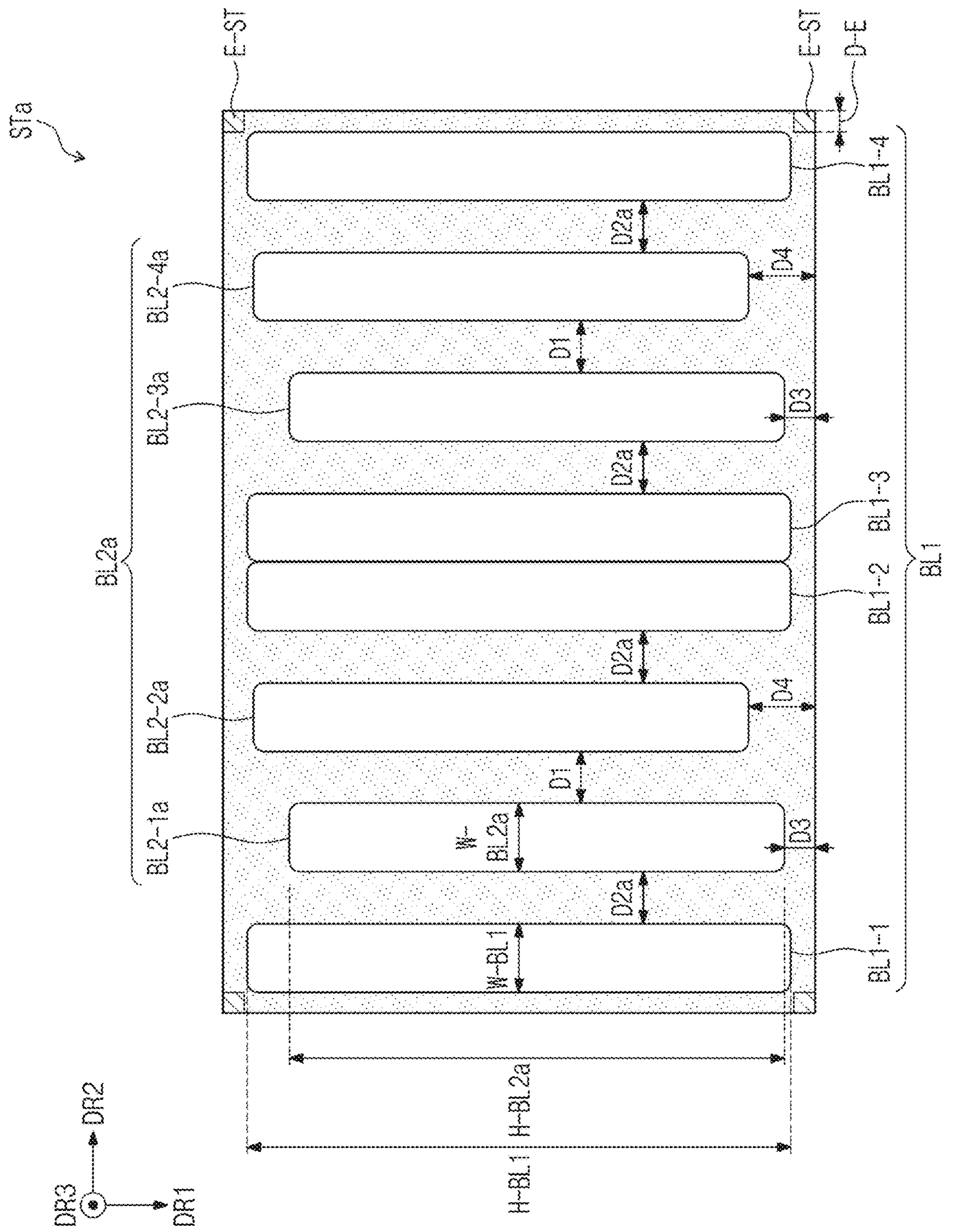
Figure 7C:
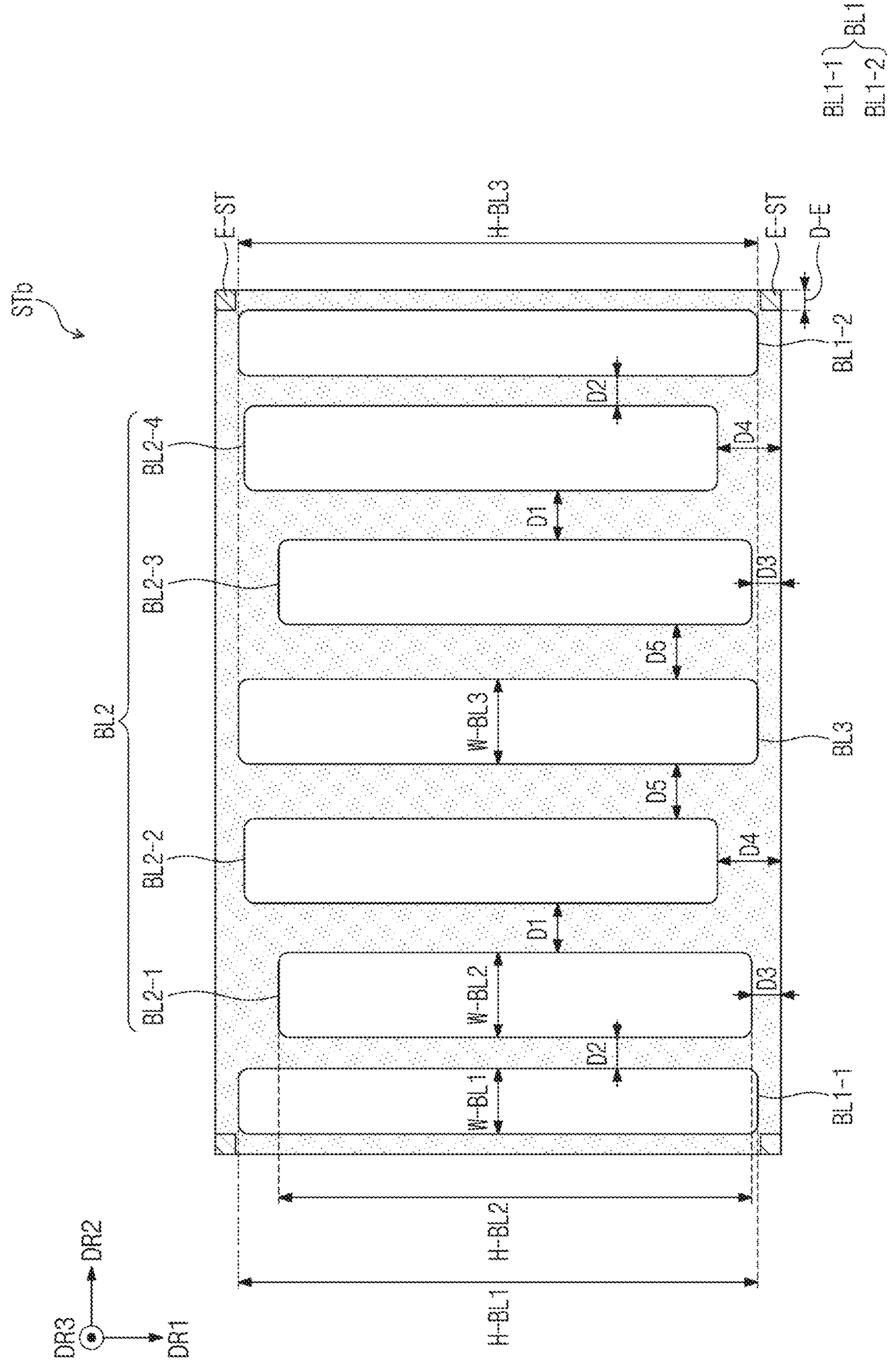

FIGS. 7A to 7C are plan views of stages ST, STa, and STb according to embodiments of the present disclosure.

Referring to FIGS. 7A to 7C, in embodiments, the size and the number of the first and second blocks BL1 and BL2 may be modified depending on the window WIN (refer to FIG. 5) disposed on the stage ST. In such embodiments, the arrangement of the first blocks BL1 and the second blocks BL2 may be changed according to a shape of the robot arm RH (refer to FIG. 5).

Referring to FIG. 7A, in an embodiment, the stage ST may include the first blocks BL1 and the second blocks BL2. The first blocks BL1 may include four first blocks BL1-1, BL1-2, BL1-3, and BL1-4, and the second blocks BL2 may include four second blocks BL2-1, BL2-2, BL2-3, and BL2-4. A length W-BL1 in the second direction DR2 of the first blocks BL1 may be about 22 mm, and a length H-BL1 in a first direction DR1 of the first blocks BL1 may be about 180 mm. A length W-BL2 in the second direction DR2 of the second blocks BL2 may be about 30 mm, and a length H-BL2 in the first direction DR1 of the second blocks BL2 may be about 158 mm. A tolerance of the lengths W-BL1, H-BL1, W-BL2, and H-BL2 of the first and second blocks BL1 and BL2 may be about ±5 mm.

A distance D1 between the first second block BL2-1 and the second block BL2-2 and a distance D1 between the third second block BL2-3 and the fourth second block BL2-4 may each be about 11.75 mm. A distance D2 between the first block BL1-1 and the first second block BL2-1, a distance D2 between the second first block BL1-2 and the second block BL2-2, a distance D2 between the third first block BL1-3 and the third second block BL2-3, and a distance D2 between the fourth first block BL1-4 and the fourth second block BL2-4 may each be about 8.375 mm.

A distance D3 between the first second block BL2-1 and a long side of the stage ST and a distance D3 between the third second block BL2-3 and the long side of the stage ST may each be about 8.37 5 mm. A distance D4 between the second block BL2-2 and the long side of the stage ST and a distance D4 between the fourth second block BL2-4 and the long side of the stage ST may each be about 23.625 mm.

A corner portion E-ST of the stage ST may have a square shape. A length D-E of one side of the corner portion E-ST may be about 5 mm. A tolerance of the distances and the length D1, D2, D3, D4, and D-E may be about ±2.5 mm. The window WIN (refer to FIG. 5) disposed on the stage ST may have a size of about 7.55 inches.

Referring to FIG. 7B, in an alternative embodiment, the stage STa may include first blocks BL1 and second blocks BL2*a*. The first blocks BL1 may include four first blocks BL1-1, BL1-2, BL1-3, and BL1-4, and the second blocks BL2*a* may include four second blocks BL2-1*a*, BL2-2*a*, BL2-3*a*, and BL2-4*a*. A length W-BL1 in the second direction DR2 of the first blocks BL1 may be about 22 mm, and a length H-BL1 in the first direction DR1 of the first blocks BL1 may be about 180 mm. A length W-BL2*a* in the second direction DR2 of the second blocks BL2*a* may be about 22 mm, and a length H-BL 2*a* in the first direction DR1 of the second blocks BL2*a* may be about 158 mm. A tolerance of the lengths W-BL1, H-BL1, W-BL2*a*, and H-BL2*a* of the first and second blocks BL1 and BL2*a* may be about ±5 mm.

A distance D1 between a first second block BL2-1*a* and a second block BL2-2*a* and a distance D1 between a third second block BL2-3*a* and a fourth second block BL2-4*a* may each be about 11.75 mm. A distance D2*a* between a first block BL1-1 and the first second block BL2-1*a*, a distance D2*a* between a second first block BL1-2 and the second block BL2-2*a*, a distance D2*a* between a third first block BL1-3 and the third second block BL2-3*a*, and a distance D2*a* between a fourth first block BL1-4 and the fourth second block BL2-4*a* may each be about 16.375 mm.

A distance D3 between the first second block BL2-1*a* and a long side of the stage STa and a distance D3 between the third second block BL2-3*a* and the long side of the stage STa may be about 8.375 mm. A distance D4 between the second block BL2-2*a* and the long side of the stage STa and a distance D4 between the fourth second block BL2-4*a* and the long side of the stage STa may each be about 23.625 mm.

A corner portion E-ST of the stage STa may have a square shape. A length D-E of one side of the corner portion E-ST may be about 5 mm. A tolerance of the distances and the length D1, D2*a*, D3, D4, and D-E may be about ±2.5 mm. The window WIN (refer to FIG. 5) disposed on the stage STa may have a size of about 6.7 inches.

Referring to FIG. 7C, in another alternative embodiment, the stage STb may include first blocks BL1, second blocks BL2, and a third block BL3. The first blocks BL1 may include two first blocks BL1-1 and BL1-2, and the second blocks BL2 may include four second blocks BL2-1, BL2-2, BL2-3, and BL2-4. A length W-BL1 in the second direction DR2 of the first blocks BL1 may be about 22 mm, and a length H-BL1 in the first direction DR1 of the first blocks BL1 may be about 180 mm. A length W-BL2 in the second direction DR2 of the second blocks BL2 may be about 30 mm, and a length H-BL2 in the first direction DR1 of the second blocks BL2 may be about 158 mm. A length W-BL 3 in the second direction DR2 of the third block BL3 may be about 30 mm, and a length H-BL3 in the first direction DR1 of the third block BL3 may be about 180 mm. A tolerance of the lengths W-BL1, H-BL1, W-BL2, H-BL2, W-BL3, and H-BL3 of the first, second, and third blocks BL1, BL2, and BL3 may be about ±5 mm.

A distance D1 between a first second block BL2-1 and a second block BL2-2 and a distance D1 between a third second block BL2-3 and a fourth second block BL2-4 may each be about 11.75 mm. A distance D2 between a first block BL1-1 and the first second block BL2-1 and a distance D2 between a second first block BL1-2 and the fourth second block BL2-4 may each be about 8.375 mm.

A distance D3 between the first second block BL2-1 and a long side of the stage STb and a distance D3 between the third second block BL2-3 and the long side of the stage STb may each be about 8.37 5 mm. A distance D4 between the second block BL2-2 and the long side of the stage STb and a distance D4 between the fourth second block BL2-4 and the long side of the stage STb may each be about 23.625 mm. A distance D5 between the third block BL3 and the second block BL2-2 and a distance D5 between the third block BL3 and the third second block BL2-3 may each be about 15.375 mm.

A corner portion E-ST of the stage STb may have a square shape. A length D-E of one side of the corner portion E-ST may be about 5 mm. A tolerance of the distances and the length D1, D2, D3, D4, D5, and D-E may be about ±2.5 mm. The window WIN (refer to FIG. 5) disposed on the stage STb may have a size of about 11.5 inches.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A stage comprising:
   - a bottom portion;
   - a plurality of support portions extending in a first direction and spaced apart from each other in a second direction crossing the first direction;
   - a plurality of blocks coupled with the plurality of support portions, respectively; and
   - a plurality of porous films, each covering an upper surface of a corresponding one of the plurality of blocks.

2. The stage of claim 1, wherein the plurality of blocks are inserted detachably into the plurality of support portions, respectively.

3. The stage of claim 1, wherein the plurality of blocks and the plurality of support portions comprise a magnetic material.

4. The stage of claim 1, wherein
   - each of the plurality of blocks comprises the upper surface and a plurality of side surfaces connected to the upper surface, and each of a plurality of boundary portions, where the upper surface is in contact with the plurality of side surfaces, respectively, has a radius of curvature.

5. The stage of claim 4, wherein the radius of curvature of each of the plurality of boundary portions is equal to or greater than about 4 millimeters and equal to or smaller than about 5 millimeters.

6. The stage of claim 1, wherein the plurality of blocks comprise a plurality of first blocks and a plurality of second blocks, each of the plurality of second blocks having a shape different from a shape of each of the plurality of first blocks, and one side surface of each of the plurality of first blocks is provided with a groove defined therein.

7. The stage of claim 6, wherein the plurality of first blocks are arranged spaced apart from each other in the second direction, some second blocks among the plurality of second blocks are disposed between two first blocks adjacent to each other among the plurality of first blocks, and other second blocks among the plurality of second blocks are disposed between other two first blocks adjacent to each other among the plurality of first blocks.

8. The stage of claim 7, wherein one of the two first blocks adjacent to each other faces one of the other two first blocks adjacent to each other.

9. The stage of claim 1, wherein the bottom portion, the plurality of support portions, and the plurality of blocks have a white color.

10. The stage of claim 1, wherein each of the plurality of blocks comprises the upper surface and a plurality of side surfaces connected to the upper surface, a porous film among the plurality of porous films covers the upper surface and the plurality of side surfaces of a corresponding block among the plurality of blocks, and a portion of the porous film covering the plurality of side surfaces is disposed between a corresponding support portion among the plurality of support portions and the corresponding block.

11. The stage of claim 1, wherein each of the plurality of porous films is provided with a plurality of openings defined through opposing sides thereof.

12. The stage of claim 1, wherein each of the plurality of porous films comprises a body portion, a protrusion portion, and a corner connection portion, the body portion covers the upper surface and two side surfaces of a corresponding block among the plurality of blocks, the protrusion portion covers one side surface connected to the two side surfaces, and the corner connection portion is connected to the body portion and the protrusion portion.

13. The stage of claim 1, wherein each of the plurality of porous films has a thickness equal to or greater than about 0.1 millimeter and equal to or smaller than about 0.3 millimeter.

14. The stage of claim 1, wherein a plurality of pores is defined in each of the plurality of porous films, and a diameter of each of the plurality of pores is equal to or greater than about 2 micrometers and equal to or smaller than about 3 micrometers.

15. A curing device comprising:

a stage; and a light irradiation portion which radiates a light to the stage, wherein the stage comprises:

a bottom portion;

a plurality of support portions extending in a first direction and spaced apart from each other in a second direction crossing the first direction;

a plurality of blocks coupled with the plurality of support portions and inserted detachably into the plurality of support portions, respectively; and a plurality of porous films, each covering an upper surface of a corresponding one of the plurality of blocks.

16. The curing device of claim 15, wherein each of the plurality of blocks comprises the upper surface and a plurality of side surfaces connected to the upper surface, and each of a plurality of boundary portions, where the upper surface is in contact with the plurality of side surfaces, respectively, has a radius of curvature.

17. The curing device of claim 16, wherein the radius of curvature of each of the plurality of boundary portions is equal to or greater than about 4 millimeters and equal to or smaller than about 5 millimeters.

18. The curing device of claim 16, wherein a porous film among the plurality of porous films covers the upper surface and the plurality of side surfaces of a corresponding block among the plurality of blocks, and a portion of the porous film covering the plurality of side surfaces is disposed between a corresponding support portion among the plurality of support portions and the corresponding block.

19. The curing device of claim 15, wherein the plurality of blocks comprise a plurality of first blocks and a plurality of second blocks, each of the plurality of second blocks having a shape different from a shape of each of the plurality of first blocks, and one side surface of each of the plurality of first blocks is provided with a groove defined therein.

20. The curing device of claim 19, wherein the plurality of first blocks are arranged spaced apart from each other in the second direction, some second blocks among the plurality of second blocks are disposed between two first blocks adjacent to each other among the plurality of first blocks, and other second blocks among the plurality of second blocks are disposed between other two first blocks adjacent to each other among the plurality of first blocks.

* * * * *